March 27, 1962  F. H. GREEN  3,026,681
HIGH PRESSURE RATIO AIR CONDITIONING SYSTEM
Filed Oct. 19, 1960
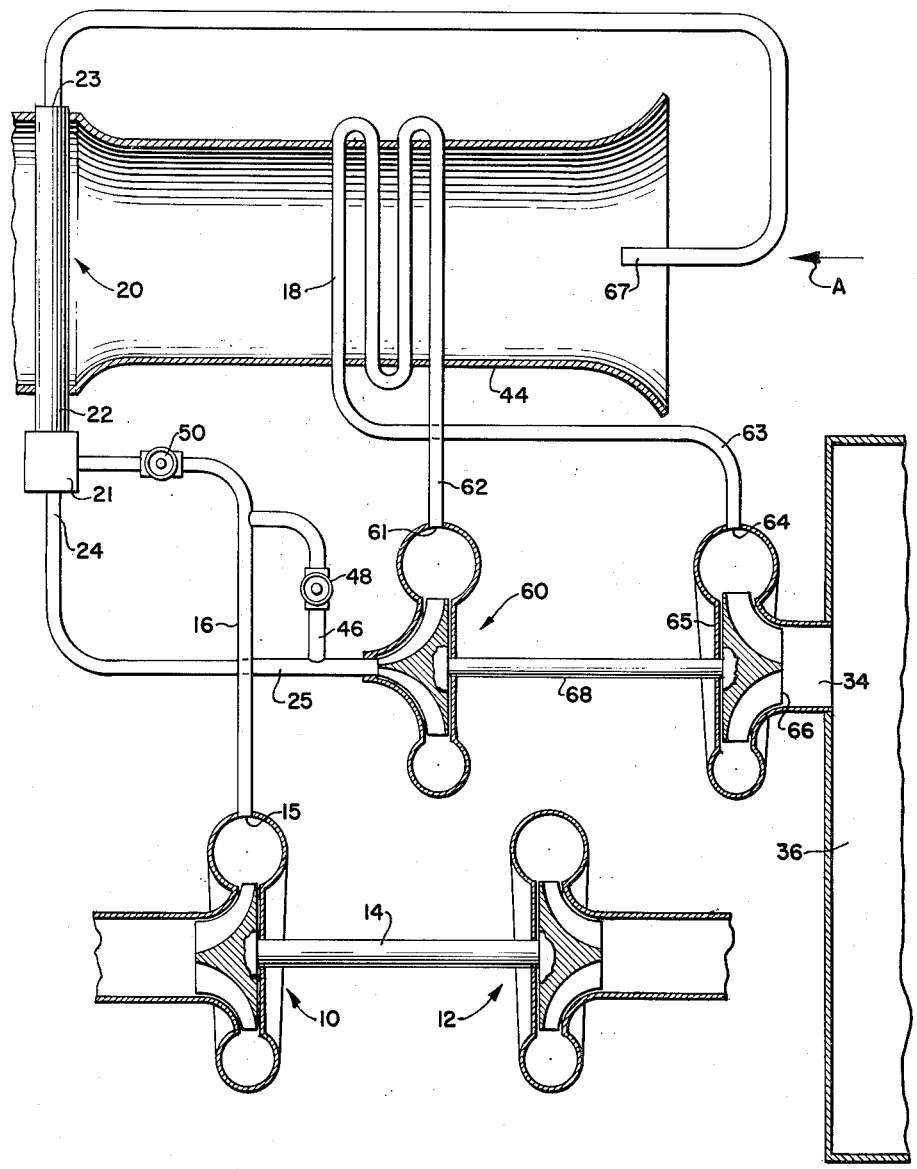
INVENTOR:
FREDERICK H. GREEN,
BY
J. Thomas Eubanks
Attorney.

United States Patent Office 3,026,681
Patented Mar. 27, 1962

3,026,681
HIGH PRESSURE RATIO AIR CONDITIONING SYSTEM
Frederick H. Green, Palos Verdes Estates, Calif., assignor to The Garrett Corporation, Los Angeles, Calif., a corporation of California
Filed Oct. 19, 1960, Ser. No. 63,633
12 Claims. (Cl. 62—5)

This invention pertains to expansion type air conditioning systems and more particularly to an expansion type system having at least two means connected in series for expanding the gaseous fluid, at least one of which means is a vortex tube.

This application is a continuation-in-part of my copending application, Serial No. 623,754, filed November 21, 1956, now Patent No. 2,958,202, and entitled "High Pressure Ratio Cooling System."

In presently known air cycle air conditioning systems, the expansion turbines used are designed to handle a maximum pressure ratio of approximately 10:1. Therefor, difficulties have arisen when conditions in such a system call for pressure ratios of the order of 20:1 to 30:1, as may be necessary in the utilization of high pressure gas turbine bleed air.

The term "bleed air" as used in this application, refers to compressed air which is withdrawn, or bled, from the compressor of an engine, such as a gas turbine, for use in an air conditioning system and for other purposes. An air conditioning system of the type described herein has numerous applications and may be used in vans, shelters, trailers, and for enclosures such as the cabins and compartments of ships and other vehicles.

The utilization of high pressure bleed air in air condtiioning systems makes the designing of efficient expansion turbines difficult. While a single multistage turbine can be designed to handle pressure ratios of the order of 20:1 to 30:1, its efficiency may be materially lower than that of a single stage turbine operating at, for example, half such pressure ratios and its mechanical and aerodynamic design more difficult.

Accordingly, it is the principal object of this invention to overcome the disadvantages of the prior systems by providing a multistage expansion type cooling system in which at least one of the stages of expansion is performed in a vortex tube.

It is another object of this invention to provide a two-stage expansion type cooling system having unique means for regulating the pressure of the bleed air supplied to the second stage, so that a wide range of pressures may be handled.

It is also another object of this invention to provide an expansion type cooling system having at least two expansion devices and having novel means for reducing the temperature of the bleed air before it is admitted to the second expansion means.

These and other objects and advantages of the invention will be more easily understood by those skilled in the art from the following description of the embodiment of the invention illustrated in the accompanying drawing.

Referring to the drawing, there is disclosed a compressor unit 10 which supplies air to a point of use such as the combustion chamber of a gas turbine compressor. The compressor unit 10, in turn, is driven by the turbine unit 12 of the gas turbine compressor by means of a shaft 14. Compressed air is bled from the compressor 10 at a bleed tap 15 and is connected to the remainder of the system by means of a duct 16. The pressure of the bleed air in some installations may have a pressure of the order of 300 inches of mercury absolute and a temperature of the order of 550° F. On the other hand, the pressure in the space or enclosure 36 being cooled may be of the order of 15 inches of mercury absolute. Thus a pressure ratio of about 20:1 exists between the bleed air pressure and the pressure existing in space 36.

In accordance with the invention the high pressure fluid at the bleed tap 15 is conducted by means of the duct 16 to an inlet chamber 21 of a vortex tube 20. The fluid which flows out of the vortex tube through the cold outlet 24 is conveyed through a conduit 25 to the inlet of a compressor 60. Compressed air flowing through the discharge 61 of the compressor is ducted to the inlet of a cooler or heat exchanger 18 by means of a conduit 62, and is then conveyed from the heat exchanger by a conduit 63 to an inlet 64 of an expansion turbine 65. From inlet 64 the pressurized air flows over the blades of the turbine wheel where it is expanded and reduced in pressure and temperature. A duct 34 connects the discharge 66 of the expansion turbine 65 with the space 36, which may be a shelter, a trailer, the cabin of a boat, or any other enclosure which it is desired to cool and/or pressurize. The rotor of the expansion turbine 65 is connected to the impeller of the compressor 60 by means of a shaft 68. Thus the work abstracted from the compressed fluid in the expansion turbine 65 is employed to drive the compressor.

The heat exchanger 18 is mounted in a cooling duct 44 by any desired means (not shown) so that a coolant may be conducted through the duct to cool the fluid in the heat exchanger before the fluid flows to the expansion turbine 65. The hot tube 22 of the vortex tube 20 extends upwardly from the inlet chamber 21 of the tube into the cooling duct 44 so that the exterior of the hot tube may also be cooled by the fluid flowing through the cooling duct. In order to promote circulation of the coolant fluid over the heat exchanger 18 and the hot tube 22, a jet pump 67 may be utilized to augment the flow of ambient fluid through the duct 44 in the direction of arrow A. In the embodiment of the invention disclosed in the drawing, the jet pump 67 is shown driven by fluid bled from an end 23 of the hot tube 22 of the vortex tube. However, it is to be understood that other means may be utilized to operate the jet pump. On moving objects such as boats, ram air may be directed through the cooling duct to provide an additional degree of cooling.

The vortex tube 20 referred to above is a device which, when supplied with a stream of compressed fluid, will divide the fluid into a stream of high temperature fluid which flows in the hot tube 22 and a stream of cooled fluid which flows from the cold outlet 24. The vortex tube of this invention is similar in construction to the one disclosed in United States Patent No. 1,952,281 to C. J. Ranque.

A by-pass duct 46 connects the duct 16 directly to the inlet of the compressor 60 so that the vortex tube 20 may be by-passed if it is so desired. A valve 48 is mounted in the duct 46 to control the quantity of air flowing in the by-pass duct 46. In order to proportionally control the air flowing to the vortex tube 20, a valve 50 is mounted in the duct 16. This arrangement of valves 48 and 50 thus allows the by-passing of a portion of the bleed air from the pressure source directly to the compressor 60 of the second stage of the system while conducting the remainder of the bleed air through the vortex tube 20, or permits the complete by-passing of the vortex tube. If desired, the valves 48 and 50 may be electrically operated and remotely controlled, by any type of control means well known in the art, so that a properly controlled flow of bleed air is supplied to both the vortex tube and the second stage of the system in accordance with pre-selected conditions. In cases where it is desired to save additional weight, valve 50 may be eliminated and valve 48 used as the sole means of control.

When the pressure of the bleed air is low it may be desirable to completely by-pass the vortex tube 20. When the pressure of the bleed air is high, substantially all of the bleed air would first flow through the vortex tube. Thus, the bleed air flow to the vortex tube 20 can be controlled from zero to a maximum air flow so that the second stage of the system will be supplied with an air flow which varies over a relatively narrow pressure range. Thus, the second stage of the system will operate at near its maximum efficiency for all pressures of the bleed air.

The above system thus supplies a means whereby the high pressure bleed air from the compressor 10 may be expanded over a pressure ratio on the order of 20:1 to 30:1 and supplied to an enclosure which is to be cooled and/or pressurized. The vortex tube also functions to precool the air before it is supplied to the second stage of the system, thus allowing the use of aluminum heat exchangers instead of stainless steel heat exchangers which results in a saving in cost and weight.

The subject invention can also be applied to an air conditioning system of the type shown in the second stage which is modified by installing a new engine having increased power since the presently installed second stage of the system can be retained, and all that is necessary to adapt the system to the higher bleed air pressures is to add the vortex tube 20 and the necessary valves to the system. In this case, the vortex tube 20 would act as the first stage of the new system and reduce the pressure of the bleed air at the second stage to approximately the same pressure as the pressure of the bleed air previously supplied by the old engine.

Accordingly, while but one preferred embodiment of this invention has been described in detail, it will be apparent to those skilled in the art that other embodiments are possible and may be desirable within the spirit and scope of the invention.

I claim:

1. Mechanism for conditioning fluid to be supplied to an enclosure comprising: a source of high pressure fluid; a vortex tube having an inlet communicating with said pressure source, a hot tube, and a cold outlet; a compressor having an inlet communicating with the cold outlet of said vortex tube; conduit means for conveying fluid from the pressure side of said compressor to the enclosure; a cooler in said conduit means for cooling the fluid discharged from said compressor; an expansion engine in said conduit means on the discharge side of said cooler; and means for delivering power recovered by said expansion engine to said compressor.

2. Mechanism for conditioning fluid to be supplied to an enclosure comprising: a source of high pressure fluid; a vortex tube having an inlet communicating with said pressure source, a hot tube, and a cold outlet; a compressor having an inlet communicating with the cold outlet of said vortex tube; conduit means for conveying fluid from the pressure side of said compressor to the enclosure; a cooler in said conduit means for cooling the fluid discharged from said compressor; means for bringing said cooler and the hot tube of said vortex tube into heat exchange relation with a coolant; an expansion engine in said conduit means on the discharge side of said cooler; and means for delivering power recovered by said expansion engine to said compressor.

3. Mechanism for conditioning fluid to be supplied to an enclosure comprising: a source of high pressure fluid; a vortex tube having an inlet communicating with said pressure source, a hot tube, and a cold outlet; a compressor having an inlet communicating with the cold outlet of said vortex tube; conduit means for conveying fluid from the pressure side of said compressor to the enclosure; a cooler in said conduit means for cooling the fluid discharged from said compressor; means for bringing said cooler and the hot tube of said vortex tube into heat exchange relation with a coolant, said means including coolant circulating means associated with the hot tube of said vortex tube; an expansion engine in said conduit means on the discharge side of said cooler; and means for delivering power recovered by said expansion engine to said compressor.

4. Mechanism for conditioning fluid to be supplied to an enclosure comprising: a source of high pressure fluid; a vortex tube having an inlet communicating with said pressure source, a hot tube, and a cold outlet; a compressor having an inlet communicating with the cold outlet of said vortex tube; by-pass means for conducting a portion of the high pressure fluid directly from said pressure source to the inlet of said compressor; conduit means for conveying fluid from the pressure side of said compressor to the enclosure; a cooler in said conduit means for cooling the fluid discharged from said compressor; an expansion engine in said conduit means on the discharge side of said cooler; and means for delivering power recovered by said expanison engine to said compressor.

5. Mechanism for conditioning fluid to be supplied to an enclosure comprising: a source of high pressure fluid; a vortex tube having an inlet communicating with said pressure source, a hot tube, and a cold outlet; a compressor having an inlet communicating with the cold outlet of said vortex tube; a by-pass duct for conducting high pressure fluid directly from said pressure source to the inlet of said compressor; valve means for proportionally controlling the fluid flow through said by-pass duct and the inlet of said vortex tube; conduit means for conveying fluid from the pressure side of said compressor to the enclosure; a cooler in said conduit means for cooling the fluid discharged from said compressor; an expansion engine in said conduit means on the discharge side of said cooler; and means for delivering power recovered by said expansion engine to said compressor.

6. Mechanism for conditioning fluid to be supplied to an enclosure comprising: a source of high pressure fluid; a vortex tube having an inlet communicating with said pressure source, a hot tube, and a cold outlet; a compressor having an inlet communicating with the cold outlet of said vortex tube; by-pass means for conducting a portion of the high pressure fluid directly from said pressure source to the inlet of said compressor; conduit means for conveying fluid from the pressure side of said compressor to the enclosure; a cooler in said conduit means for cooling the fluid discharged from said compressor; means for bringing said cooler and the hot tube of said vortex tube into heat exchange relation with a coolant; an expansion engine in said conduit means on the discharge side of said cooler; and means for delivering power recovered by said expansion engine to said compressor.

7. An expansion type space cooling system comprising: a source of pressurized gas; a pair of series connected fluid expansion means; one of said means being a vortex tube and the other being an expansion engine; said expansion engine driving a fluid propelling means; a duct system for connecting said source to the inlet of one of said expansion means; the outlet of said one expansion means being connected to the inlet of said propelling means; the outlet of said propelling means being connected to the inlet of said other expansion means and the outlet of said other expansion means discharging to the space.

8. An expansion type space cooling system comprising: a source of pressurized gas; a pair of series connected expansion devices; one of said devices being a vortex tube and the other being an expansion turbine, said expansion turbine driving a fluid compressor; said source being connected to the inlet of said vortex tube; the outlet of said vortex tube being connected to the inlet of said compressor; the outlet of said compressor being connected through a heat exchanger to the inlet of said turbine; and the outlet of said turbine being connected to the space.

9. Mechanism for conditioning fluid to be supplied to an enclosure, comprising: conduit means for conducting a flow of conditioning fluid to the enclosure; a pair of fluid expansion means in said conduit means, one of said expansion means being a vortex tube having an inlet, a hot tube and a cold outlet, the other of said expansion means being an expansion engine; fluid compressor means in said conduit means, said compressor means being driven by said expansion engine; duct means disposed to convey a coolant into heat exchange relation with the hot tube of said vortex tube; and means operatively connected with one of said expansion means and arranged for inducing flow of coolant through said duct means.

10. Mechanism for conditioning fluid to be supplied to an enclosure, comprising: conduit means for conducting a flow of conditioning fluid to the enclosure; a pair of fluid expansion means in said conduit means, one of said expansion means being a vortex tube having an inlet, a hot tube and a cold outlet, the other of said expansion means being an expansion engine; fluid compressor means in said conduit means, said compressor means being driven by said expansion engine; cooler means disposed in said conduit means intermediate the expansion engine and the compressor means; duct means disposed to convey a coolant into heat exchange relation with said cooler means and the hot tube of said vortex tube; and means operatively connected with one of said expansion means and arranged for inducing flow of coolant through said duct means.

11. Mechanism for conditioning fluid to be supplied to an enclosure, comprising: a source of high pressure fluid; a vortex tube having an inlet communicating with said pressure source, a hot tube, and a cold outlet; a compressor having an inlet communicating with the cold outlet of said vortex tube; conduit means for conveying fluid from the pressure side of said compressor to the enclosure; a cooler in said conduit means for cooling the fluid discharged from said compressor; an expansion engine in said conduit means on the discharge side of said cooler; means for delivering power recovered by said expansion engine to said compressor; duct means disposed to convey a coolant into heat exchange relation with said cooler and the hot tube of said vortex tube; passage means for conducting fluid from the hot tube of said vortex tube to a jet pump arranged for pumping coolant through said duct means.

12. Mechanism for conditioning fluid to be supplied to an enclosure, comprising: a source of high pressure fluid; a vortex tube having an inlet communicating with said pressure source, a hot tube, and a cold outlet; a compressor having an inlet communicating with the cold outlet of said vortex tube; conduit means for conveying fluid from the pressure side of said compressor to the enclosure; a cooler in said conduit means for cooling the fluid discharged from said compressor; an expansion engine in said conduit means on the discharge side of said cooler; means for delivering power recovered by said expansion engine to said compressor; duct means disposed to convey a coolant into heat exchange relation with said cooler and the hot tube of said vortex tube; passage means for conducting fluid from the hot tube of said vortex tube to pumping means operated by said fluid and arranged for pumping coolant through said duct means.

References Cited in the file of this patent
UNITED STATES PATENTS

| | | |
|---|---|---|
| 2,585,570 | Messinger | Feb. 12, 1952 |
| 2,669,101 | Shields | Feb. 16, 1954 |